United States Patent
Boey et al.

(10) Patent No.: US 8,137,315 B2
(45) Date of Patent: Mar. 20, 2012

(54) SELF-CONTAINED PUMP

(75) Inventors: Yin Chiang Freddy Boey, Singapore (SG); Jan Ma, Singapore (SG); Erwin Merijin Wouterson, Singapore (SG)

(73) Assignee: Nanyang Technological University, Singapore (SG)

( * ) Notice: Subject to any disclaimer, the term of this patent is extended or adjusted under 35 U.S.C. 154(b) by 76 days.

(21) Appl. No.: 12/307,265

(22) PCT Filed: Jun. 28, 2007

(86) PCT No.: PCT/SG2007/000186
§ 371 (c)(1),
(2), (4) Date: May 18, 2009

(87) PCT Pub. No.: WO2008/004982
PCT Pub. Date: Jan. 10, 2008

(65) Prior Publication Data
US 2009/0312709 A1 Dec. 17, 2009

Related U.S. Application Data

(60) Provisional application No. 60/818,338, filed on Jul. 5, 2006.

(51) Int. Cl.
*A61M 1/00* (2006.01)
*F04B 17/00* (2006.01)
(52) U.S. Cl. ............. 604/153; 604/151; 604/890.1; 417/413.2
(58) Field of Classification Search .... 604/890.1–892.1, 604/131, 151, 153; 417/472, 413.2
See application file for complete search history.

(56) References Cited

U.S. PATENT DOCUMENTS

| | | | |
|---|---|---|---|
| 3,963,380 A | | 6/1976 | Thomas et al. |
| 4,519,751 A | | 5/1985 | Beckman et al. |
| 5,215,446 A | * | 6/1993 | Takahashi et al. ............ 417/322 |
| 5,338,164 A | | 8/1994 | Sutton et al. |
| 5,481,152 A | * | 1/1996 | Buschulte ..................... 310/328 |
| 6,071,088 A | | 6/2000 | Bishop et al. |
| 6,730,123 B1 | | 5/2004 | Klopotek |
| 6,869,275 B2 | | 3/2005 | Dante et al. |
| 2007/0030573 A1 | * | 2/2007 | Batchko et al. ............... 359/665 |

FOREIGN PATENT DOCUMENTS

CN 2053683 U 2/1990
WO WO 2005/096028 A1 10/2005

OTHER PUBLICATIONS

PCT International Search Report for PCT/SG2007/000186, mailed Aug. 3, 2007, 3 pages.
PCT International Preliminary Report on Patentability for PCT/SG2007/000186, dated Feb. 14, 2008, 6 pages.
Office Action for counterpart Chinese Patent Application No. 200780025452.3 with English translation, 12 pages, May 23, 2011.

* cited by examiner

*Primary Examiner* — Jackie Ho
*Assistant Examiner* — Leah Stohr
(74) *Attorney, Agent, or Firm* — Blakely, Sokoloff, Taylor & Zafman LLP.

(57) ABSTRACT

A self-contained pump is disclosed that is an integrated pump. It has a reservoir, a pumping mechanism, and at least one outlet. The pumping mechanism is for controlled compression of the reservoir to force a required volume of fluid in the reservoir through the at least one outlet.

8 Claims, 4 Drawing Sheets

SELF-CONTAINED PUMP

CROSS REFERENCE TO RELATED APPLICATIONS

This patent application is a U.S. National Phase application under 35 U.S.C. 371 of International Application No. PCT/SG2007/000186, filed on 28 Jun. 2007, entitled SELF-CONTAINED PUMP, which claims priority to U.S. provisional application No. 60/818,338, filed 5 Jul. 2006.

TECHNICAL FIELD

This invention relates to a self-contained pump and refers particularly, though not exclusively, to a pump having integrated therewith a reservoir, pumping mechanism, and outlet.

BACKGROUND

In general, the basic building blocks of a pump include a reservoir, connecting conduits, pumping region, outlet, and pump housing. The size of the pump is often related to the required performance. In many industries there is an ongoing trend to miniaturize products. This ongoing miniaturization increases the need for smaller pumps. Reservoirs and connecting conduits can easily be miniaturized down to the nanometer scale with available etching techniques. However, the actual pumping mechanism is often a limiting factor in pump miniaturization. The limiting factor can be the physical size or the efficiency of the pump. Present pumps are not small enough for future applications. There is a need for even smaller pumps that have the ability for accurate control.

SUMMARY

According to an exemplary aspect there is provided a self-contained pump comprising: as an integrated pump, a reservoir, a pumping mechanism, and at least one outlet; whereby the pumping mechanism is for controlled compression of the reservoir to force a required volume of fluid in the reservoir through the at least one outlet.

The self-contained pump may further comprise an inlet, the inlet being the outlet. The pumping mechanism may comprise at least one piezoelectric actuator on at least one wall of the reservoir.

The reservoir may comprise a plurality of walls. The plurality of walls may comprise a top wall, at least one side wall, and a bottom wall. At least one of the plurality of walls may be relatively rigid. At least one other of the plurality of walls may be relatively flexible.

The self-contained pump my further comprise a flexible membrane over each outlet of the at least one outlet. The flexible membrane may be thin and transparent.

The self-contained pump may further comprise a central core within the reservoir, the at least one outlet being aligned with the central core. The central core may have at least one hole therethrough for fluidic communication between the reservoir and the at least one outlet. The central core may extend between and seals with the top wall and the bottom wall. The central core may be relatively rigid. The at least one opening may be in one of: the top wall and the bottom wall. The at least one opening may be aligned with the central core. The central core may be a hollow cylinder.

A reduction in compression of the reservoir may be to force a part of the required volume of fluid into the reservoir through the at least one outlet.

The at least one piezoelectric actuator may comprise at least one of: a helix around the at least one side wall, a double helix around the at least one side wall, at least two piezoelectric actuators on the bottom wall, corner posts of a plurality of side walls where the at least one side wall comprises the plurality of side walls, and a piezoelectric actuator on opposite walls of the plurality of side walls.

According to another exemplary aspect there is provided a fluidic lens apparatus for an optical apparatus, the fluidic lens apparatus comprising the self-contained pump as described above. The optical apparatus may be at least one of: a digital camera, a digital camera in a mobile telephone, endoscope, security system camera, and optical storage device.

According to a further exemplary aspect there is provided apparatus for controlled release of drugs, the apparatus comprising a self-contained pump as described above.

BRIEF DESCRIPTION OF THE DRAWINGS

In order that the invention may be fully understood and readily put into practical effect there shall now be described by way of non-limitative example only exemplary embodiments, the description being with reference to the accompanying illustrative drawings.

IN THE DRAWINGS

Figure 1:
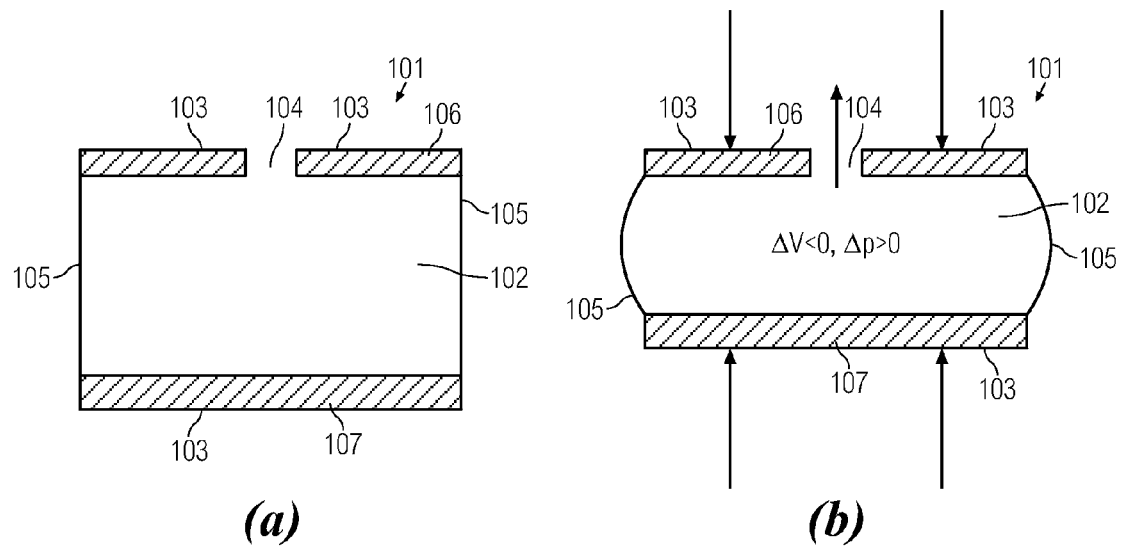
Figure 2:
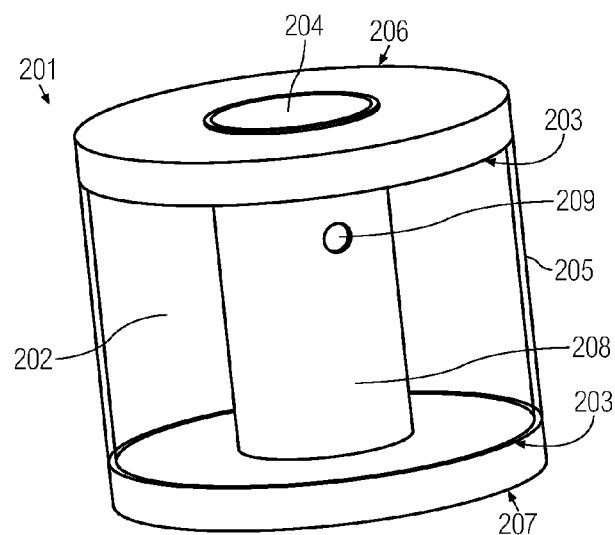
Figure 3:
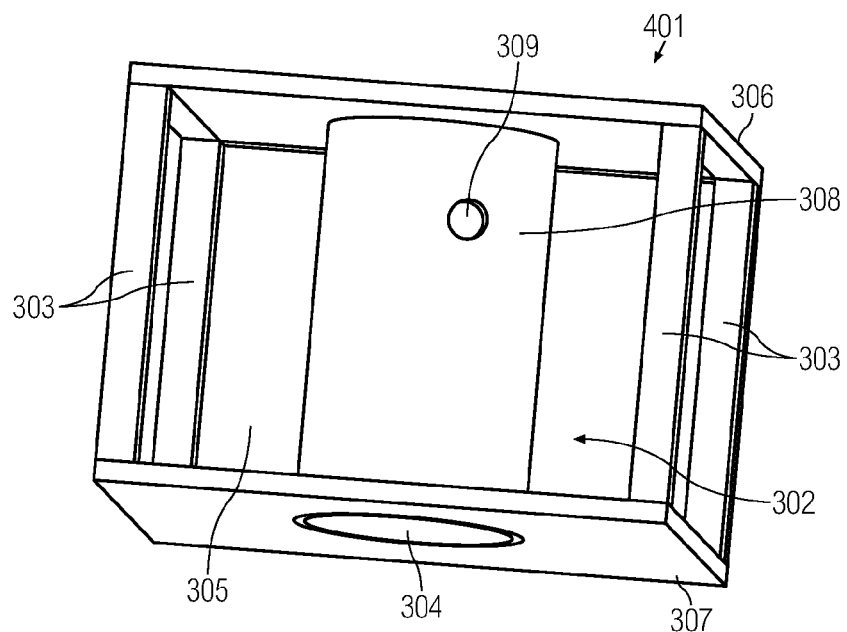
Figure 4:
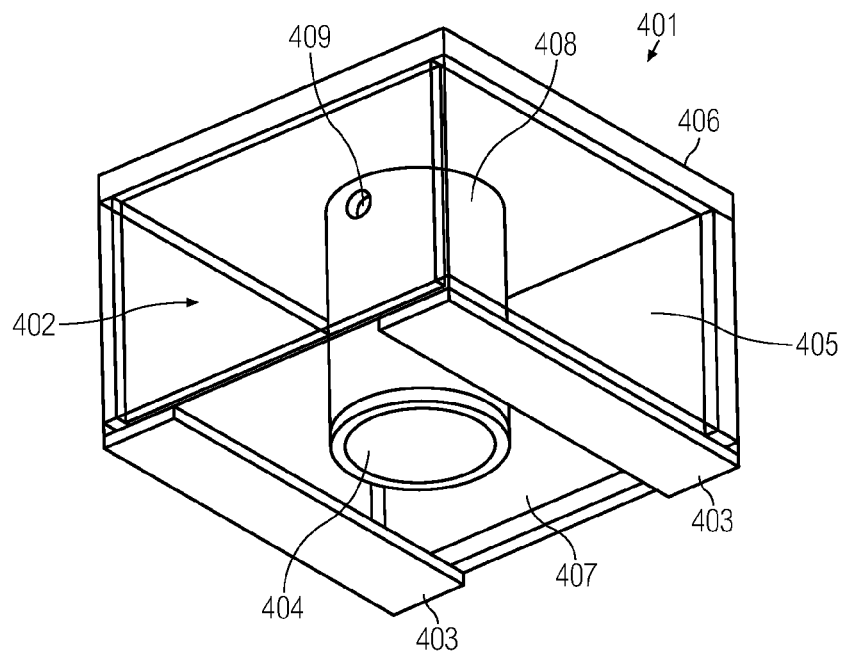
Figure 5:
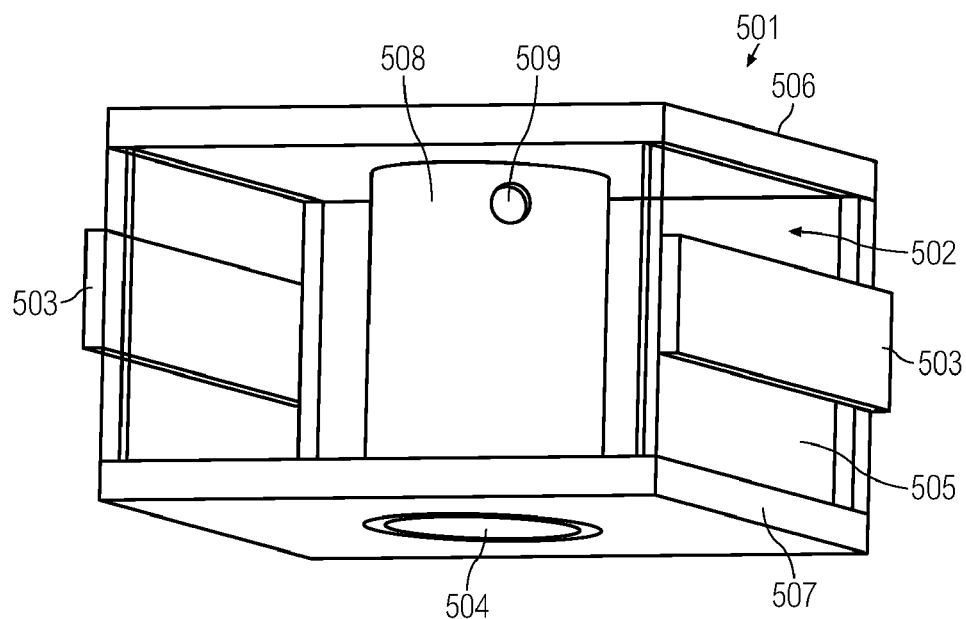
Figure 6:
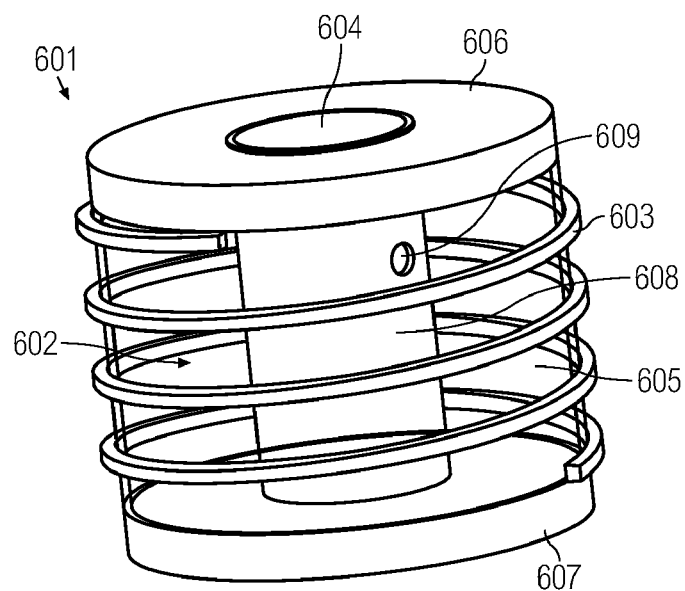
Figure 7:
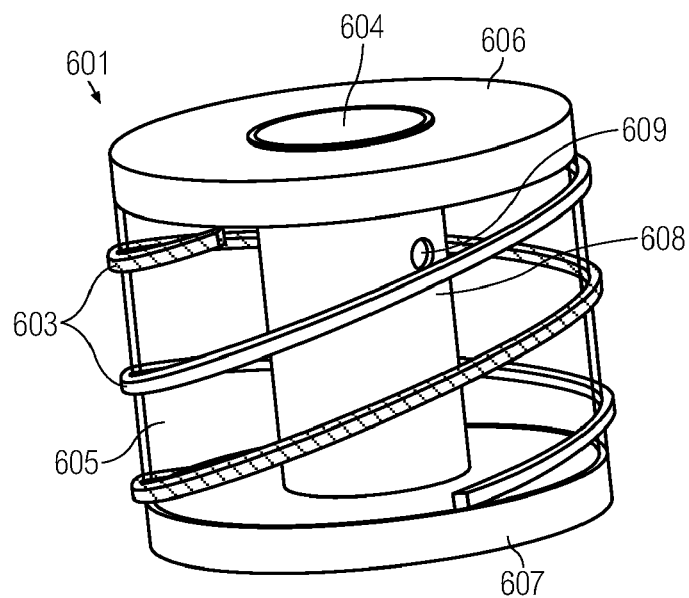

FIG. 1 is a schematic illustration of the pumping principle of an exemplary embodiment;

FIG. 2 is a front perspective view of another exemplary embodiment;

FIG. 3 is a front perspective view of another exemplary embodiment;

FIG. 4 is a front perspective view of a further exemplary embodiment;

FIG. 5 is a front perspective view of yet another exemplary embodiment;

FIG. 6 is a front perspective view of yet another exemplary embodiment;

FIG. 7 is a front perspective view of a penultimate exemplary embodiment and

Figure 8:
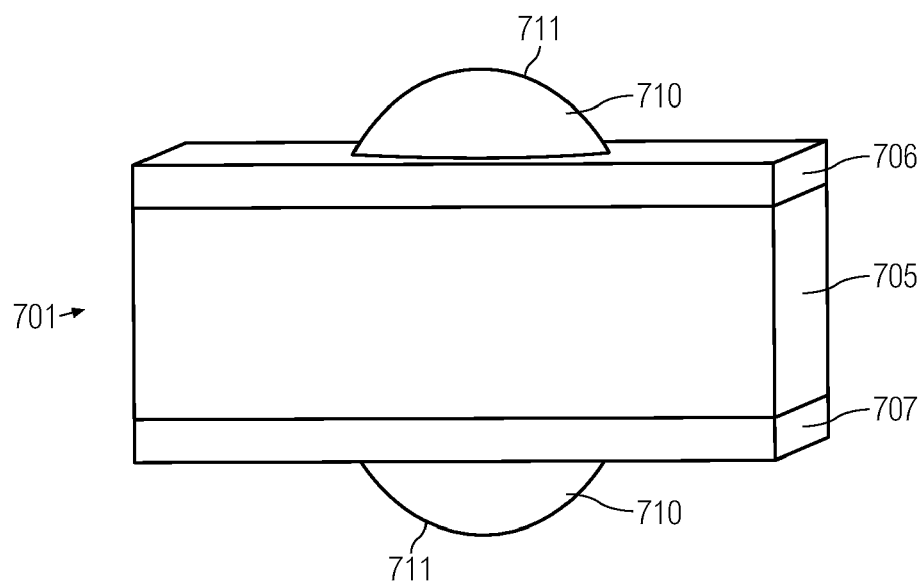

FIG. 8 is a front perspective view of a final exemplary embodiment.

DETAILED DESCRIPTION OF THE PREFERRED EMBODIMENTS

In each drawing figure the same reference numerals are used for like components with a prefix numeral indicating the drawing figure relevant.

According to the exemplary embodiment of FIG. 1, there is provided a pump 101 whereby the reservoir 102, pumping mechanism 103, and outlet 104 are all integrated 20 into one device. The pump 101 can have any possible, practical shape and has flexible side walls 105. Pumping mechanism actuators 103 may be on or in either or both of the top wall 106 and the bottom wall 107. Operation of the actuators 103 causes compression of either or both of the walls 106, 107 as shown in FIG. 1 (b). This compression of either or both of the walls 106, 107 will lead to a volume reduction $\Delta V$ inside the reservoir 102 thereby causing an increase in the pressure $\Delta P$ inside the reservoir 102. As such, $\Delta V<0$, and $\Delta P>0$. This increase in internal pressure in the reservoir 102 forces fluid in the reservoir to flow through the outlet 104. Accurate control of the compression will lead to an accurate output of the pump 101. The integration of all the components may lead to a reduction in size which will be useful in various applications, including drug delivery, optics, micro-refrigeration, cooling of semiconductor devices, and so forth. The outlet 104 may be in any one of the walls, 105, 106 and 107. There may be more than one outlet 104. If more than one outlet 104, they may be in different walls 105, 106 and 107.

The pumping mechanism actuators 103 may comprise all or part of the walls 106 and/or 107. They may be integrated with the walls 106 and/or 107, or may be securely attached to the walls 106 and/or 107. The actuators 103 may be of any suitable or required shape including, but not limited to: circular, annular, cantilever, polygonal, rectangular, square, helical, spiral, and so forth. Although being shown in FIG. 1 as being central, the outlet 104 may be at any suitable location in any one or more of the walls 105, 106 and/or 107. The actuators 103 are preferably micro actuators and the pump 101 may be micro or nano sized. The pump 101 may be a part of a closed fluid circuit.

The pump 101 can also operate in reverse whereby the fluid outside the reservoir 102 can be drawn back into the reservoir 102 when the volume of the pump 101 increases by reduction of or eliminating the compression on the walls 106 and/or 107. In this way the outlet 104 may also be an inlet. By varying the amount of compression to the walls 106 and/or 107, different amounts of fluid can be moved. Accurate amounts of fluid can be driven with precise compression of the walls 106 and/or 107 of the device.

The pump configuration may be adapted to various applications. The shape of the pump may be any suitable and practical shape. At least one of the walls of the pump is made of a flexible material, this being side walls 105 as shown in FIG. 1. The material of flexible walls 105 needs to be flexible in order to deflect under the applied compression force, causing a volume reduction inside the pump 101. Suitable wall materials include all elastomeric materials such as, for example, PDMS.

Deformation of the flexible walls 105 can be established in various ways. The walls 106 and/or 107 can be compressed as described above or pulled internally from a core. External compression may be established by using single or multiple actuators 103. The actuators deform upon introduction of a signal such as, for example, an electrical voltage, ultraviolet light, pH, or the like. They may be of a photomechanical material. Accurate controlling of the applied voltage, allows for an accurate compression of the flexible walls and thus accurate pumping rate. The deformation mechanism of the actuators can be based on piezoelectricity, pneumatics, magnetism, hydraulics, and so forth.

Besides external compression, the walls can also be deformed from an internal force. For example, if magnetic particles are included in the flexible wall and a magnetic core is positioned at the center of the device, the wall can be pulled towards the core upon activation of the core.

Some examples of possible PZT-actuated solutions for optical applications are given in FIGS. 2 to 6. In FIG. 2 there is a cylindrically-shaped pump 201 having flexible side walls 205; and end walls 206 and 207 forming the reservoir 202. Either or both of the end walls 206, 207 may comprise pump actuators 203 that may be on the inner surface of the walls 206 and/or 207. Within the reservoir 202 is a hollow central core 208 that preferably is of a relatively rigid material. The central core 208 extends between and seals with the end walls 206 and 207. The outlet 204 is in the top wall 206 and is aligned with the central core 208.

The central core 208 may be cylindrical (as shown) or any other suitable shape. It has one or more holes 209 for fluid flow therethrough when the pressure inside the reservoir 202 is increased or decreased. In this way the reservoir 202 stores the fluid and the central core acts as a conduit for the fluid to outlet 204. The central core 208 would, during normal operation, be filled with the fluid. When the pump is not in use, the high surface tension of the fluid at outlet 204 will prevent the fluid from moving into the central core 208. The holes 209 may be circular, square, rectangular, or randomly shaped. In this was the pump 201 may be used to control the size and shape of a bubble of fluid at the outlet 204.

The central core 208 preferably does not move during operation of the pump 201. Movement of the central core 208 might lead to inaccurate ejection of fluid thereby affecting the overall performance of the pump 201. There are several options to keep the central core 208 relatively rigid during operation: use of a stiff material (i.e. acrylic, epoxy, metal) preferably in combination with either or both of the end walls 206, 207 being relatively stiff and, more preferably, parallel.

The flexible reservoir 202 is positioned around the central core 208. The side wall 205 is flexible and may be of a relatively flexible material such as, for example, poly-dim-ethyl-siloxane (PDMS). The side wall 205 may be made with existing molding or etching techniques. The elastic modulus of the side wall 205 and its thickness may be varied in order to vary the performance of the pump 201. The shape of the pump 201 may be cylindrical (as shown), cuboid, spherical, or otherwise as required or desired.

In FIG. 3, the central core 308 and hole(s) 309 are as for the embodiment of FIG. 2. The actuators 303 form corner posts for the flexible side walls 305. The top wall 306 and bottom wall 307 are both relatively rigid. In this case the four actuators 303 may be individually and separately controllable to give a high degree of control over the compression of the fluid in reservoir 302. The opening 304 is in the bottom wall 307, and is aligned with the central core 308.

For FIG. 4, the pump 401 has the same central core 408 with holes 409. The top wall 406 is relatively rigid, as are the side walls 405. The bottom wall is relatively flexible and has two cantilever actuators 403 mounted thereon. The actuators 403 may extend for the full length of the bottom wall 407, or may extend for part of the length of the bottom wall 407. The two actuators 403 are shown at opposite ends of the bottom wall 407. They may be placed in any required or desired position on the bottom wall 407. There may be any required or desired number of actuators 403.

The pump 501 of FIG. 5 has the same central core 508 with holes 509. The top wall 506 is relatively rigid, as is the bottom wall 507. The side walls 505 are relatively flexible and have two cantilever actuators 503 mounted thereon on opposite sides of the side walls 505. The actuators 503 may extend for the full length of each of the side walls 505, or may extend for part of the length of each side wall 507. The two actuators 503 are shown on opposite sides of the side wall 505. They may be placed in any required or desired position on any of the side walls 505. There may be any required or desired number of actuators 503.

The pump 601 of each of FIGS. 6 and 7 has the same central core 608 with holes 609. The top wall 606 is relatively rigid, as is the bottom wall 607. The cylindrical side wall 605 is relatively flexible and has a spiral or helical actuator 603 mounted thereon. The actuator 603 may extend for the full height of the side wall 605, or may extend for part of the height of the side wall 605. The actuator 603 may be placed at any required or desired position on the side wall 605 and may be a single helix as illustrated in FIG. 6 or a double helix as illustrated in FIG. 7. The pitch of the helix may be as required or desired.

The pump 101 is ideal for applications where only limited space is available. The pump 101 is advantageous for driving a liquid lens used in a wide range of optical imaging applications including, but not limited to, digital cameras, camera phones, endoscopes, security systems cameras and optical storage drives. A liquid lens is able to change its focal length by changing its curvature by adding or removing fluid in the lens, the lens being a droplet at the outlet 104. It may also be used in other areas such as, for example, micro refrigeration systems for use with IC components, variable multi-jet nozzles, and so forth.

To change the curvature of the droplet, fluid has to be moved to or from the droplet. FIG. 8 shows a possible configuration of the proposed pump 701 to drive a liquid lens 710. The pump 701 in FIG. 7 is a simplified design that may be replaced by configurations as shown in FIGS. 2 to 6. A flexible membrane 711 is added on the top and bottom of the pump 701 in order to prevent the liquid of droplet 710 that forms the lens from flowing out of the pump 701. The membrane 711 is preferably thin and transparent. The actuators are not shown but may be in accordance with the forms as shown in any one of FIGS. 1 to 6, or otherwise as required or desired.

Another suitable application for pump 101 (including the pumps 201, 301, 401, 501 and 601) is controlled drugs release as the pump 101 is able to move accurate amounts of fluid with precise displacement of the actuators 103. For example, the pump 101 is suitable for insulin injection whereby only microliters of insulin need to be injected into the human body every few minutes. Present commercial devices tend to be rather bulky and the cartridge needs to be replaced every few days. The pump 101 will reduce the size of the insulin pump significantly, reducing the discomfort of the patient. Due to the compact size of the pump 101, the reservoir 102 may be enlarged to increase the time between the changing of the cartridges. The pump 101 may be used externally or after implantation. In addition, the power consumption of the pump 101 is relatively low, allowing the pump 101 to be powered by standard dry cell batteries.

Whilst there has been described in the foregoing description exemplary embodiments, it will be understood by those skilled in the technology concerned that many variations in details of design, construction and/or operation may be made without departing from the present invention.

What is claimed is:

1. An apparatus for controlled release of drugs, the apparatus comprising a self-contained pump comprising:

a reservoir;

at least one outlet;

a pumping mechanism comprising at least one piezoelectric actuator on at least one wall of the reservoir, wherein the at least one piezoelectric actuator comprises at least one selected from the group consisting of: (1) a helix around at least one side wall of the reservoir, (2) a double helix around at least one side wall of the reservoir, (3) at least two piezoelectric actuators on a bottom wall of the reservoir, (4) corner posts of a plurality of side walls of the reservoir, and (5) at least one piezoelectric actuator integrated with at least one of the bottom wall and a top wall of the reservoir; and a central core within the reservoir; whereby the pumping mechanism is for controlled compression of the reservoir to force a required volume of fluid in the reservoir through the at least one outlet, and whereby the central core extends between and seals with the top wall and the bottom wall of the reservoir, the central core being substantially rigid.

2. The apparatus of claim 1, wherein the outlet acts as an inlet.

3. The apparatus of claim 1, wherein the reservoir comprises a plurality of walls, the plurality of walls comprising the top wall, the at least one side wall, and the bottom wall, wherein at least one of the plurality of walls is substantially rigid, and wherein at least one other of the plurality of walls is substantially flexible.

4. The apparatus of claim 1, wherein the at least one outlet is aligned with the central core.

5. The apparatus of claim 1, wherein the central core has at least one hole there through for fluid communication between the reservoir and the at least one outlet.

6. The apparatus of claim 5, wherein the at least one hole is provided in one of: the top wall and the bottom wall, wherein the at least one hole is aligned with the central core.

7. The apparatus of claim 6, wherein the central core is a hollow cylinder.

8. The apparatus of claim 1, wherein a reduction in compression of the reservoir is to force a part of the required volume of fluid into the reservoir through the at least one outlet.

* * * * *